United States Patent [19]
Mayfield et al.

[11] Patent Number: 4,750,599
[45] Date of Patent: Jun. 14, 1988

[54] DRIVE COUPLING WITH A VENTABLE SEAL

[75] Inventors: Leonard E. Mayfield, Lima, Ohio; Charles F. Huddleston, Jr., Indianapolis, Ind.

[73] Assignee: General Motors Corporation, Detroit, Mich.

[21] Appl. No.: 48,781

[22] Filed: May 11, 1987

[51] Int. Cl.$^4$ .................. F16D 11/00; F16H 57/00
[52] U.S. Cl. ........................................ 192/66; 74/405; 192/67 R; 192/112
[58] Field of Search .......... 192/67 R, 97, 112, 109 D, 192/66; 74/405; 277/3, 29

[56] References Cited

U.S. PATENT DOCUMENTS

| | | | |
|---|---|---|---|
| 980,777 | 1/1911 | Havens | 192/109 D |
| 3,504,563 | 4/1970 | Polak | 74/405 |
| 3,504,564 | 4/1970 | Kell | 74/405 |
| 4,491,037 | 1/1985 | Bullock | 74/405 X |
| 4,590,818 | 5/1986 | Teraoka | 74/473 R |

*Primary Examiner*—Rodney H. Bonck
*Attorney, Agent, or Firm*—Donald F. Scherer

[57] ABSTRACT

A drive coupling is movable to selectively engage and disengage a drive shaft with a final drive gear set. The coupling is sealingly disposed within a housing. To prevent the pressure within the housing from increasing or decreasing during movement of the coupling, a vent structure is formed on the drive coupling. The vent structure cooperates with the seal member to vent the housing during movement of the drive coupling to thereby ensure pressure balance within the housing.

2 Claims, 1 Drawing Sheet

DRIVE COUPLING WITH A VENTABLE SEAL

The invention herein described was made in the course of work under a contract or subcontract thereunder with the Department of the Army.

BACKGROUND OF THE INVENTION

This invention relates to drive couplings and more particularly to linearly movable drive couplings disposed in a sealed final drive housing.

In track laying vehicles, it is sometimes necessary to permit towing of the vehicle. To facilitate towing, it is desirable to disengage the power transmission from the drive sprocket. Generally, a final drive planetary is disposed between the transmission output shaft and the drive sprocket and a drive coupling is connected therebetween. The drive coupling is manually movable between engaged and disengaged positions to permit the drive sprocket to be connected with the transmission output or freely rotatable, respectively.

It is also desirable to prevent dirt, water and other atmospheric contaminants from entering the drive sprocket. To this end, a lip seal is generally provided which is slidably disposed on the drive coupling Such an arrangement may be seen in U.S. Pat. No. 4,491,037, issued Jan. 1, 1985, to Bullock and assigned the assignee of the present invention.

While these sealing arrangements operate satisfactorily, the movement of the drive coupling within the housing can cause a change in the pressure condition within the housing. For example, the coupling is generally movable inward towards the transmission to connect the drive. This movement results in a decrease in volume of air within the housing and thereby an increase in the pressure of the air within the housing. It is possible for this air pressure to cause the drive coupling to return to the disengaged position when such movement is not desirable.

SUMMARY OF THE INVENTION

The present invention seeks to overcome this disadvantage of the prior art by providing a vent structure on the drive coupling which will permit balancing of the internal pressure of the final drive housing with atmosphere during movement of the drive coupling. The vent structure is comprised of a plurality of longitudinally extending grooves formed on the outer cylindrical surface of the drive coupling between the seal locations defined by the engaged and disengaged positions. Therefore, during movement of the coupling between these positions, the grooves will permit the transfer of air to or from the final drive housing to ensure that pressure balance is maintained at either of the operating positions.

It is therefore an object of this invention to provide an improved drive coupling with a ventable seal wherein the drive coupling is disposed within a sealed housing and is movable between an engaged position and a disengaged position by linear movement thereof, and wherein sealing surfaces on the coupling contact a seal element at both positions, and also wherein the coupling has a substantially cylindrical surface between said positions with a plurality of longitudinally disposed venting grooves formed in said surface intermediate said positions whereby the seal is vented during a change in position of the drive coupling.

It is another object of this invention to provide an improved drive coupling and a ventable seal arrangement wherein the venting of a sealed chamber which houses the drive coupling is provided by longitudinally extending grooves formed on the outer sealing surface of the drive coupling, which grooves pass under the seal during linear movement of the drive coupling to permit venting of the sealed chambers during such movement.

These and other objects and advantages of the present invention will be more apparent from the following specification and drawings.

DESCRIPTION OF THE PREFERRED EMBODIMENT

Figure 1:
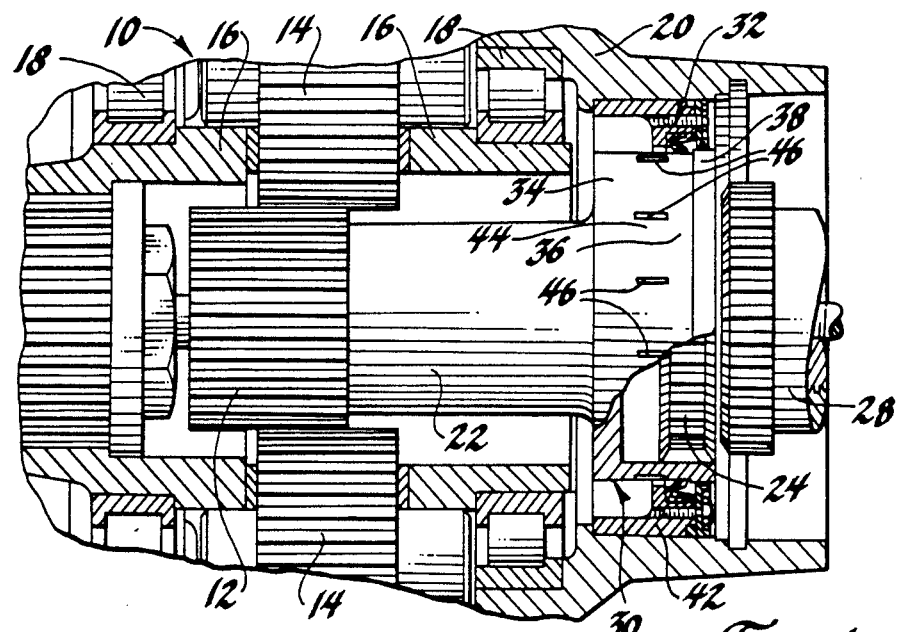
FIG. 1 is a cross-sectional view of a portion of a drive coupling and sealed housing incorporating the present invention.

Referring to the drawings, wherein like characters represent the same or corresponding parts throughout the several views, there is seen a portion of a planetary final drive, generally designated 10, which includes a sun gear 12 meshing with a plurality of pinion gears 14 which are rotatably disposed in a planet carrier 16. The planet carrier 16 is supported by bearings 18 in a housing 20.

The sun gear 12 is formed integrally with or otherwise connected to a drive coupling 22. The drive coupling 22 has a spline portion 24 which is adapted to engage a spline 26 formed on a transmission output shaft 28. The spline portion 24 is surrounded by a cylindrical collar or surface 30 which is engaged by a lip seal 32. The cylindrical surface 30 is continuous in a circumferential direction at a seal surface 34 at the left side thereof and a seal surface 36 at the right side thereof. The cylindrical surface 30 also has a raised portion or surface 38 disposed rightward of the continuous surface 36.

The raised surface 38 is adapted to engage a bearing 40 which is secured in an end cap 42. The bearing 40 engages the surface 38, when the coupling 22 changes in the disengaged position as shown in FIGS. 1 and 2, to maintain the drive coupling axially aligned with the transmission output shaft 28.

Intermediate the seal surfaces 34 and 36 is a cylindrical surface 44 which has formed therein a plurality of grooves 46. Each groove 46, in and of itself, is rather shallow, however, the combination of all of the grooves provides a significant passageway for air to be moved from one side of seal 32 to the other.

Figure 2:
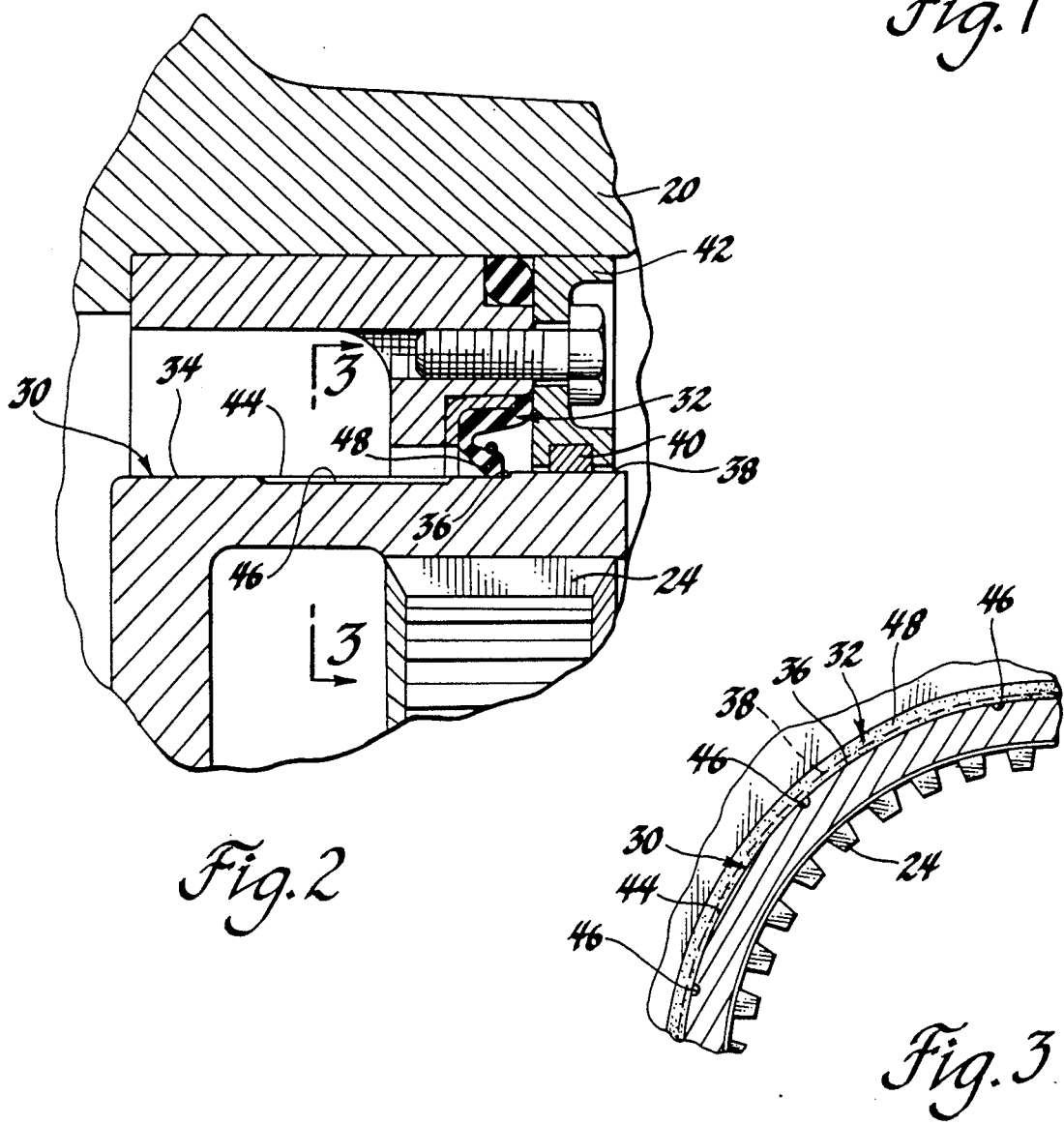
FIG. 2 is an enlarged sectional view of a portion of FIG. 2 showing the seal and drive coupling arrangement.
Figure 3:
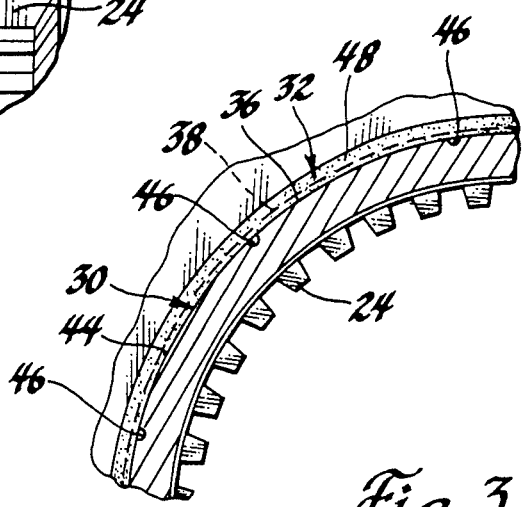
FIG. 3 is a view taken along line 3—3 of FIG. 2.

As seen in FIGS. 1 and 2, the sealing lip 48 of seal 32 engages the seal surface 36 when the coupling is in the disengagement position shown. When the coupling is moved to the engaged position, that is, spline portion 24 engages spline 26, the sealing lip 48 will engage the seal surface 34. Therefore, in both positions, the interior of housing 20 and the interior of the transmission housing, in which shaft 28 is located, are sealed from each other. However, during movement to and from the engaged and disengaged positions, the coupling 22 will be moved relative to the sealing lip 48 and during this movement, the sealing lip 48 will encounter the grooves 46. The grooves 46 will permit the transmission of air to and from the respective housings in the transmission.

In most applications, the final drive housing has a vent connection with atmosphere and therefore the coupling has a vent connection to and from atmosphere during a change in the operating positions of the coupling. The coupling is operated by a conventional disconnecting arrangement, such as that shown in U.S. Pat. Nos. 3,504,563, issued Apr. 7, 1970, to J. C. Polak, and 3,504,564, issued Apr. 7, 1970 to N. B. Kell, both assigned to the assignee of this invention.

Since the housing is permitted to assume a pressure balance during the movement of the coupling to and from its operating positions, there will be no pressure differential across the coupling whenever an operating position is established.

The embodiments of the invention in which an exclusive property or privilege is claimed are defined as follows:

1. An improvement in a drive coupling for a selectively engaging and disengaging a final drive from a drive shaft wherein the final drive is disposed in a sealed housing and the drive coupling has a sealing surface that cooperates with a seal member secured in said housing so that a seal is effected when the drive coupling is moved to an engaged position to engage the final drive with said drive shaft and a disengaged position to disengage the final drive from said drive shaft, the improvement comprising: a pair of axially spaced outer cylindrical surfaces formed on said coupling, each said surface having a diameter sufficiently large to effect a sealing arrangement with said seal, a substantially cylindrical intermediate surface joining said spaced surfaces and having a plurality of vent means formed therein for preventing sealing of said seal when said coupling is between the engaged position and the disengaged position.

2. An improvement in a drive coupling for a selectively engageable and disengageable final drive from a drive shaft wherein the final drive is disposed in a sealed housing and the drive coupling has a sealing surface that cooperates with a seal member secured in said housing so that a seal is effected when the drive coupling is moved to an engaged position to engage the final drive with said drive shaft and a disengaged position to disengage the final drive from said drive shaft, wherein the improvement comprises spaced sealing surfaces formed on said drive coupling and cooperating with said seal member at said engaged position and said disengaged position, a substantially cylindrical portion interconnecting said spaced sealing surfaces including a plurality of circumferentially spaced axially extending grooves disposed between the spaced sealing surfaces and each groove having a depth sufficient to prevent sealing with said seal member when said coupling is moved from the engaged position to the disengaged position and vice versa.

* * * * *